Aug. 30, 1960    H. BRÜNE    2,950,832

SCREW CLOSURE WITH SAFETY RING

Filed Oct. 24, 1957    3 Sheets-Sheet 1

Inventor
Herbert Brüne

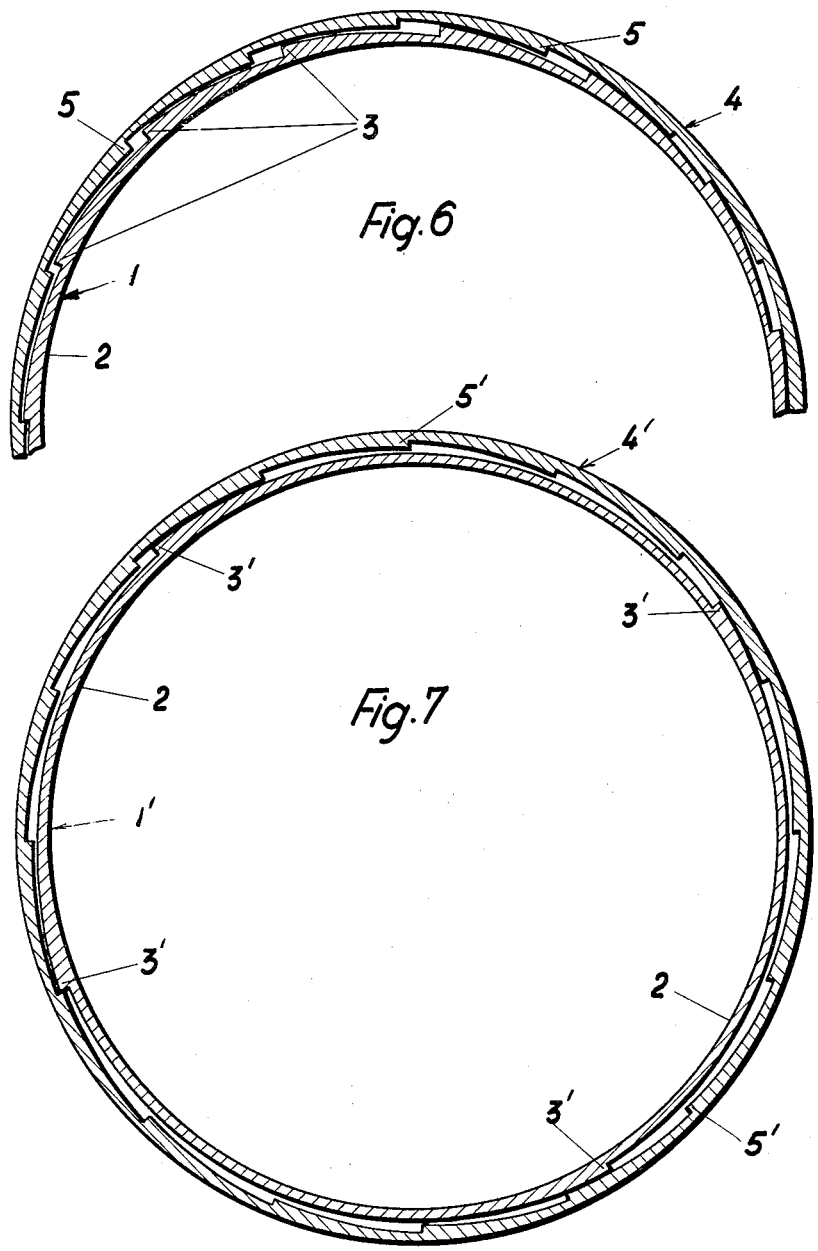

Aug. 30, 1960  H. BRÜNE  2,950,832
SCREW CLOSURE WITH SAFETY RING
Filed Oct. 24, 1957  3 Sheets-Sheet 3
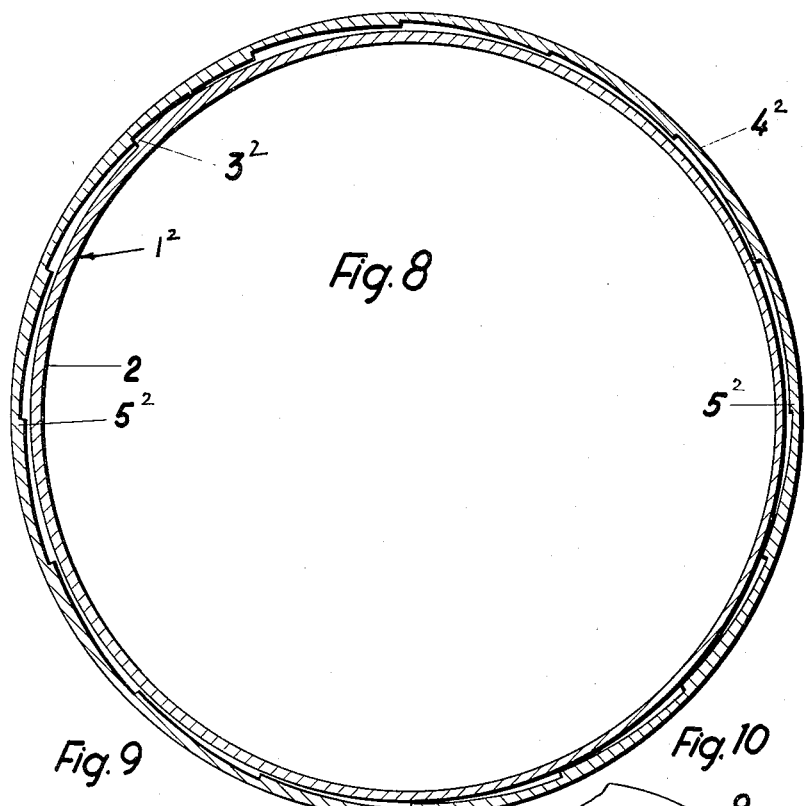
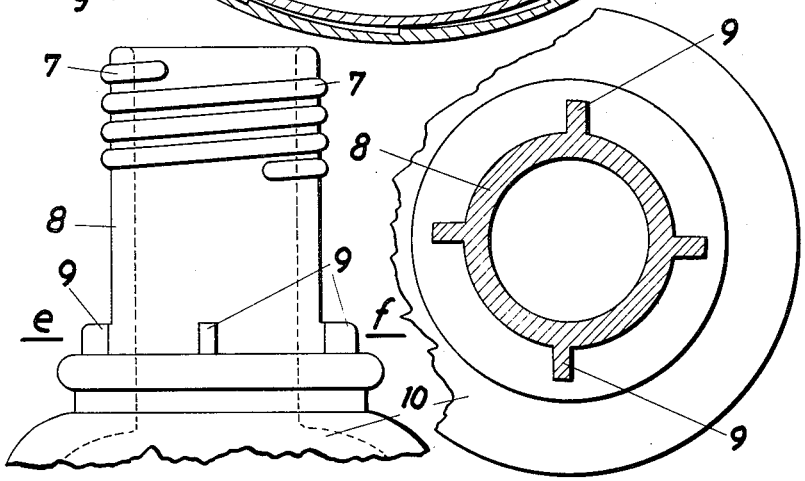
Inventor:
Herbert Brune
By Ernest Montague
Attorney

United States Patent Office 2,950,832
Patented Aug. 30, 1960

2,950,832

SCREW CLOSURE WITH SAFETY RING

Herbert Brüne, 9 Kolnerstrasse, Porz, near Koln, Germany

Filed Oct. 24, 1957, Ser. No. 692,221

Claims priority, application Germany Jan. 10, 1957

6 Claims. (Cl. 215—7)

The present invention relates to a screw closure for containers of all types which are equipped with a safety ring for security against first use of the container.

Screw closures have been proposed before which are rigidly connected with a locking or safety ring for the purpose of securing the originality of the contents in the container, which locking or safety ring is torn off upon loosening of the screw closure. The locking or safety ring will be at least partly torn during the latter operation. In order to achieve this end the ring has a saw-like inner toothing into which the closure cap having an outer toothing and projections on the neck portion of the container alternately engage. If the closure cap is screwed tight, the latter joins the locking or safety ring during the closure movement and the teeth of the ring jump over the projections of the container. During loosening of the closure cap, the projections retain the ring onto the container and the screw alone turns relative to the ring and tears off at its connecting point. Such screw closures have the drawback, that the closure cap and the locking or safety ring must be made of an integral piece of material in the first place, an expedient which is not economical and which requires complicated tools. If the closure cap and the locking or safety ring are made from the start of two parts, then they must be welded together upon manufacture thereof. In both cases the closure cap and the safety ring may be made of thermoplastic artificial material only. Thus the drawback is again apparent that the closure cap may be easily welded together again after opening of the closure, thereby reinstating the original status and renewing the closure with simulation of originality. Due to this improper after-connection of the closure cap and the locked ring the guarantee for originality is lost.

It is one object of the present invention to provide a screw closure with safety ring which avoids the drawbacks set forth above.

It is another object of the present invention to provide a screw closure with safety ring which comprises merely a screw closure cap and a safety ring which breaks upon loosening of the screw closure cap, the latter and the safety ring consisting of two non-connected parts. Thus it is made possible that these two parts are made of low priced pressed artificial material which is normally used in the construction of screw closures, which material, however, cannot be welded together again. It is understood, however, that the closure may also be made of other suitable material.

It is yet another object of the present invention to provide a screw closure with safety ring wherein the safety ring is equipped with two different holding systems against turning relative to the closure cap and relative to the container. This is brought about by means for preventing of turning of the safety ring relative to the container during tightening of the screw of the closure cap, while the latter is turnable relative to the safety ring. During unscrewing of the closure cap, the safety ring joins the movement with said cap. In this case the safety ring turns relative to the container for a comparatively small angle only and is then destroyed.

The arrangement may, however, also be made in such a manner that the safety ring turns with the screw closure cap during the tightening movement of the latter on the container mouth, while the safety ring is not permitted to turn during the loosening of the cap. The cap turns then relative to the safety ring for a predetermined angle until the safety ring is destroyed.

In both instances is the safety ring destroyed during loosening of the cap, so that the originality of the closure is lost. The screw cap may then be used as a normal closure member until the contents of the container are completely used up and may also be screwed on the container mouth during the use of the latter.

The two different holding systems for the safety ring may for instance in variation comprise two different outer, inner or end face gearings. The inner and outer gearings may be disposed also on a conical face. The gearings may be arranged in such a manner that the projections provided on the container wall and on the bottle neck, respectively, secure the safety ring against rotation relative to the container during screwing on of the cap due to the fact that said projections engage the large teeth of the safety ring, while the small teeth permit of a turning of the closure cap relative to the safety ring due to the slight elasticity of the safety ring. During loosening of the cap the small teeth of the closure cap join the safety ring to this movement while the large teeth permit only a predetermined amount of rotation of the safety ring relative to the container until the safety ring is destroyed.

The gearings may be arranged also in such a manner that the projections provided in the container wall or in the bottle neck wall mesh with a saw-like inner toothing of the safety ring having small teeth, while a toothing with large teeth engages a corresponding outer toothing of the closure cap.

During tightening of the cap, the large teeth join the safety ring to the turning movement, while the small teeth permit of a turning of the safety ring relative to the container due to the weak springy faculty of the safety ring. During loosening of the cap, the small teeth of the safety ring secure the latter against rotation relative to the container mouth, while the large teeth permit of a turning of the cap relative to the safety ring until the latter is destroyed with a strong spring effect of the safety ring.

In order to bring about a better joining of the common movement, the closure cap may be equipped on its outer face with a longitudinal flute, while the safety ring is smooth at its outer surface.

The safety ring must consist of a material which permits of a breaking of the safety ring by all means during the loosening of the closure cap. Furthermore the material must not lend itself to be welded together again in order to prevent any possibilities for the formation of simulations. Materials which are suitable for this purpose are originally brittle and non-springy.

In order to avoid the destruction of the safety ring already during screwing on of the cap, no great forces may be exerted upon the safety ring during said operation, which forces cause a deformation of the safety ring by stretching or pressing.

It is, therefore, also another object of the present invention to provide a screw closure and safety ring, wherein within the two different holding systems between the cap and the safety ring and between the safety ring and the container, respectively, the pitch of the formed teeth or of the projections is varied. If a different pitch of the two cooperating tooth portions or projections is provided, not all teeth become effective at the same time and, thereby, the safety ring may not be subjected to much tension. The teeth operate rather displaced relative to each other and the safety ring has the possibility to assume the deforming forces on its entire periphery successively. This feature of the present invention can still be improved by providing recesses at different places of the holding system between the cap and the safety ring on the cap or on the safety ring or on both, or on the projections. By deletion of teeth the safety ring is not subjected to tension on those places, rather receives there the possibility to provide additional radial spring effect and to be correspondingly deformed without being destroyed. Furthermore it is achieved that the teeth engage each other better in radial direction. If one tooth only is used, the safety ring is worked on merely on the place of this one tooth.

In corresponding manner it is also possible to eliminate at different points of the holding systems between the safety ring and the container on the safety ring or on the container or on both, a selected number of a plurality of teeth or of the projections on any selected places.

As stated above it is thus also possible to make an arrangement according to which all teeth or projections save one are eliminated on the cap and/or the safety ring and the safety ring and/or the container, respectively.

If the container is closed, the latter on the one hand and the cap on the other prevent any movement of the safety ring in upward or downward direction. It is preferred to provide the ring and the cap in different colors which are thus distinguished over each other, so that the user may easily recognize whether the original safety or security is still present.

Due to the different pitch in the gearing of the holding systems, particularly due to the additional deletion of teeth or of projections, the additional advantage is brought about that the safety ring may be mounted with certain pre-tension on the tooth or projection carrying portion of the closure cap, so that both parts are safely secured in the assembled position against disassembly.

It is still a further object of the present invention to provide a screw closure with safety ring wherein the closure cap cannot be removed and thereby endanger the safety of the originality of the closure during transportation of the container, since the safety ring does not permit a self opening of the closure cap.

With these and other objects in view which will become apparent in the following detailed description, the present invention will be clearly understood in connection with the accompanying drawings, in which:

Fig. 6 is a fragmentary section at enlarged scale of the screw closure and the safety ring to indicate the cooperation in one holding system;

Fig. 7 is a section of the screw closure and of the safety ring indicating the cooperation of another holding system;

Fig. 8 is a cross section through the screw cap and the safety ring indicating a holding system with one outer tooth on the closure cap and a plurality of inner teeth on the safety ring;

Fig. 9 is an elevation of the container mouth; and

Fig. 10 is a section along the lines e—f of Fig. 9.

Figure 1:
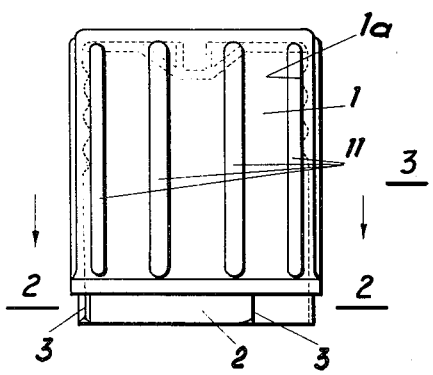
Figure 1 is a side elevation of a screw closure.
Figure 5:
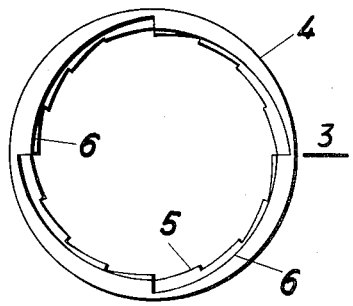
Fig. 5 is a bottom plan view thereof.
Figure 3:
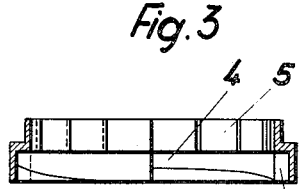
Fig. 3 is an axial section through a safety ring taken on the lines 3—3 of Fig. 5.

Referring now to the drawings, the present device comprises a screw closure cap 1 which has an inner thread 1a in order to screw the same onto the outer thread 7 of a container mouth 8. The closure cap 1 has at its outer face longitudinally disposed flutes 11 in order to provide a better grip on the closure cap 1. The screw closure cap 1 has at its lower edge for instance an outer toothing 2 with for instance four teeth 3, the distribution of which is apparent from Fig. 2. The periphery is at first divided into fifteen equal parts. Not all fifteen teeth are formed, however, rather four teeth 3 only, so that three teeth project over four pitches, while the fourth tooth projects over three pitches only. The teeth project only over the original length of the pitch, which is one-fifteenth of the periphery, while on the remaining periphery a circular section remains.

The safety ring 4 has for instance an upper, inner toothing 5 and a lower, inner toothing 6 and is preferably of plastic, expandable material and lends itself to be broken. The upper, inner toothing 5 has sixteen teeth and cooperates with the teeth 3 of the outer toothing 2.

The lower, inner toothing 6 has for instance four teeth and cooperates with corresponding teeth and projections 9, respectively, provided on the container mouth.

The concept of the present invention is disclosed only in connection with a holding system between the closure cap 1 and the safety ring 4. The same arrangement using the said concept of the present invention is applied in a holding system between the safety ring 4 and the container mouth 8, though not shown.

Referring now to Fig. 6, the cooperation between an outer toothing 2 provided on the cap with fifteen teeth and an inner toothing 5 provided on the safety ring with sixteen teeth, that means the different pitch in the cap and the safety ring, respectively, is disclosed.

Referring now to Fig. 7, the cooperation between the four outer teeth $3^1$ of the closure cap $1^1$ and the sixteen inner teeth $5^1$ of the safety ring $4^1$ is disclosed.

Referring now to Fig. 8, the cooperation between a single outer tooth $3^2$ provided at the lower edge of the cap $1^2$ and an inner toothing of the safety ring $4^2$ with sixteen teeth $5^2$ is disclosed.

The present screw closure device operates in the following manner: Upon closing the bottle or the container 10, the safety ring 4 is first mounted on the container mouth 8. The teeth 6 of the safety ring 4 engage the teeth and projections 9, respectively, of the container mouth 8, so that a turning of the safety ring 4 is at this moment impossible. The teeth 3 and 5 of the closure cap 1 and the safety ring 4, respectively, cooperate, however, in such a manner that similar to a ratchet arrangement the teeth slide over each other when the cap 1 is screwed with its thread 1a onto the outer thread 7 of the container mouth 8. The cap 1 may thus be turned relative to the immovable safety ring 4, until it is rigidly screwed onto the container mouth 8. In this position the safety ring 4 is secured between the container mouth 8 and the cap 1 against axial movement.

During loosening of the screw cap 1 the teeth 3 and 5 cooperate in such a manner, that the safety ring 4 is forced to join the turning movement by means of the teeth 3. The safety ring turns for a small angle until it is forced to expand by means of the teeth and projections 9, respectively, on the mouth of the container so much that it breaks. Now the screw cap 1 may be further unscrewed and used as a normal screw cap. The security of the originality is of course lost by this opening procedure.

As set forth above it is preferable to vary the pitch of the selectively formed teeth 3 and 5 and 6 and 9, respectively, within the two different holding systems between the cap 1 and the safety ring 4 and between the safety ring 4 and the container 10, respectively. At different places of the holding system between the cap 1 and the safety ring 4, either on the cap 1 or on the safety ring 4 or on both, any chosen number of teeth or projections may be deleted. Thus Fig. 6 shows that always one inner tooth 5 only of the safety ring 4 is under complete tension or completely without tension. The other teeth 3 and 5 are displaced relative to each other always for the distance of the pitch in the direction of the periphery and are only partly under tension. If the closure cap 1 and the safety ring 4 would have the same pitch, the same tension or non-tension would appear on all operative teeth simultaneously.

Figure 2:
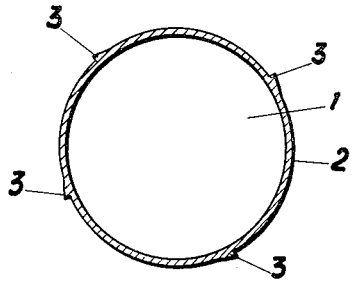
Fig. 2 is a section along the lines 2—2 of Fig. 1.
Figure 4:
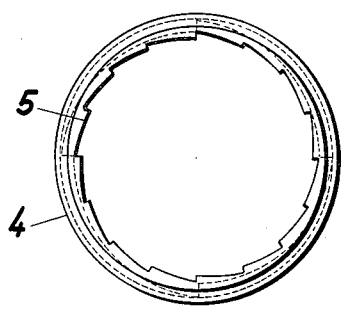
Fig. 4 is a top plan view thereof.

In the arrangement shown in Fig. 7 it is made clear in connection with the disclosure in Figs. 2 and 4 that the non-operative teeth may penetrate much deeper into the opposite gear ring than is possible in the arrangement shown in Fig. 6. This brings about the advantage that the safety ring 4, upon unscrewing of the screw cap 1, is joined in the turning movement with absolute safety and is thus broken. Furthermore it is apparent that the safety ring 4 receives additional radial resiliency by deleting teeth on the outer toothing 2.

While I have disclosed several embodiments of the present invention, it is to be understood that these embodiments are given by example only and not in a limiting sense, the scope of the present invention being determined by the objects and the claims.

I claim:

1. A screw closure of artificial material for closing the mouth portion of a container comprising a closure cap and a safety ring adapted to be destroyed during the first opening of said container, two locking systems, one of said locking systems being disposed between said closure cap and said safety ring, the other of said locking systems being disposed between said safety ring and the mouth portion of said container, one of said locking systems comprising interlocking teeth and permitting relative rotation between said closure cap and said safety ring in the mounting direction, the other of said locking systems locking said safety ring and said mouth portion during the mounting and releasing, respectively, of said closure cap on the mouth portion of said container, permitting, however, a releasing movement of said closure cap with simultaneous destruction of said safety ring, said other of said locking systems comprising two co-operating elements, one of said elements having at least one cam including a radially disposed face and a face ascending peripherally towards said radially disposed face and the other of said elements having radially disposed projections, the latter co-operating with said radially disposed face of said cam of said one of said elements to lock said elements relative to each other during the mounting of said cap, said projections co-operating with said ascending face of said cam of said one of said elements during the releasing movement of said closure cap so that a relative rotation between these elements is possible, whereby said projections ride on said ascending face and said safety ring will be destroyed by expansion.

2. The screw closure, as set forth in claim 1, wherein the pitch of said teeth of said one of said locking systems varies in said closure cap in relation to that of said safety ring.

3. The screw closure, as set forth in claim 1, wherein said safety ring has one set of a plurality of said teeth of said one of said locking systems, said teeth being saw-like inner teeth, and in axial direction below said inner teeth at least one inner cam of said other of said locking systems, and said closure cap has outer teeth complementary to said inner teeth, and said mouth portion of said container has said projections co-operating with said cam.

4. The screw closure, as set forth in claim 1, wherein said closure cap has an outer diameter larger than that of the portion of said cap carrying said teeth.

5. The screw closure, as set forth in claim 1, wherein one of said screw closure caps and said safety ring elements has one tooth only in said one of said locking systems.

6. The screw closure, as set forth in claim 1, wherein said safety ring has one set of a plurality of said teeth of said one of said locking systems, said teeth being saw-like inner teeth, and in axial directon below said inner teeth at least one inner cam of said other of said locking systems, and said closure cap has outer teeth complementary to said inner teeth and said mouth portion of said container has said projections co-operating with said cam, and said closure cap has an outer diameter larger than that portion of said closure cap carrying said teeth.

References Cited in the file of this patent

UNITED STATES PATENTS

| | | |
|---|---|---|
| 2,085,367 | Jacob | June 29, 1937 |
| 2,124,638 | Sheldon et al. | July 26, 1938 |
| 2,153,427 | Fleisch et al. | Apr. 4, 1939 |